US012780377B2

(12) United States Patent
Grall

(10) Patent No.: US 12,780,377 B2
(45) Date of Patent: Nov. 3, 2026

(54) SUBSEA AUTOMOTIVE SYSTEM TRAVELLING ALONG A PIPELINE

(71) Applicant: EXAIL, Saint-Germain-en-Laye (FR)

(72) Inventor: Sébastien Grall, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 510 days.

(21) Appl. No.: 18/546,058

(22) PCT Filed: Feb. 11, 2022

(86) PCT No.: PCT/EP2022/053411
§ 371 (c)(1),
(2) Date: Aug. 10, 2023

(87) PCT Pub. No.: WO2022/171817
PCT Pub. Date: Aug. 18, 2022

(65) Prior Publication Data
US 2024/0116611 A1 Apr. 11, 2024

(30) Foreign Application Priority Data
Feb. 12, 2021 (FR) ...................................... 2101345

(51) Int. Cl.
*B63G 8/00* (2006.01)
*F16L 1/235* (2006.01)

(52) U.S. Cl.
CPC .............. *B63G 8/001* (2013.01); *F16L 1/235* (2013.01); *B63G 2008/004* (2013.01)

(58) Field of Classification Search
CPC ... B63G 8/001; B63G 2008/004; F16L 1/235; F16L 1/20; F16L 1/26; B63C 11/52
See application file for complete search history.

(56) References Cited

U.S. PATENT DOCUMENTS

| | | | |
|---|---|---|---|
| 9,863,891 | B1 | 1/2018 | Lara Magallanes et al. |
| 2012/0117959 | A1 | 5/2012 | Lewkoski |

(Continued)

FOREIGN PATENT DOCUMENTS

| | | | |
|---|---|---|---|
| CN | 104787142 | A | 7/2015 |
| CN | 106594455 | A | 4/2017 |

(Continued)

OTHER PUBLICATIONS

International Search Report for PCT/EP2022/053411 mailed May 24, 2022, 8 pages.

(Continued)

*Primary Examiner* — Timothy P Graves
(74) *Attorney, Agent, or Firm* — NIXON & VANDERHYE

(57) ABSTRACT

Disclosed is a subsea automotive system including a unit for moving coaxially along a pipeline, an elongated body, at least three bearing members each bearing in a mobile, rolling or sliding manner on the pipeline to roll/slide in a stable manner at least parallel to the pipeline, an articulated side arm supporting a bearing member, enabling the bearing member to move transversely to the body between an open position for installing the system on the pipeline and uninstalling the system, and also an operating position in which the bearing member supported by the articulated arm is folded back to bear against the pipeline to form, with the other bearing members, a movable connection between the body and pipeline, at least three of the bearing members applied, in the operating position, to the pipeline in radial directions angularly offset about the axis of the pipe and separate from one another.

19 Claims, 5 Drawing Sheets

(56) References Cited

U.S. PATENT DOCUMENTS

| | | | | |
|---|---|---|---|---|
| 2018/0080905 | A1* | 3/2018 | Al Nahwi | G01N 29/04 |
| 2020/0132239 | A1* | 4/2020 | Mims | F16L 55/07 |
| 2021/0094186 | A1* | 4/2021 | Wehlin | B25J 9/1694 |

FOREIGN PATENT DOCUMENTS

| | | | |
|---|---|---|---|
| CN | 207298394 | U | 5/2018 |
| CN | 106594455 | B | 8/2018 |
| EP | 3515807 | A1 | 7/2019 |
| FR | 2847987 | A1 | 6/2004 |
| GB | 2542605 | A | 3/2017 |
| JP | 2533027 | B2 * | 9/1996 |
| WO | 2013192536 | A1 | 12/2013 |
| WO | 2016178045 | A1 | 11/2016 |
| WO | 2018057250 | A1 | 3/2018 |
| WO | 2018057589 | A1 | 3/2018 |

OTHER PUBLICATIONS

Written Opinion of the ISA for PCT/EP2022/053411 mailed May 24, 2022, 5 pages.

Office Action, issued in European Patent Application No. 22703685.2 dated Jun. 24, 2025.

* cited by examiner

SUBSEA AUTOMOTIVE SYSTEM TRAVELLING ALONG A PIPELINE

CROSS-REFERENCE TO RELATED APPLICATIONS

This application is the US national stage of PCT/EP2022/053411, filed Feb. 11, 2022, and designating the United States, which claims the priority of FR FR2101345, filed Feb. 12, 2021. The entire contents of each foregoing application are incorporated herein by reference.

TECHNICAL FIELD

The present invention generally relates to the field of underwater activities and in particular underwater pipeline laying. More particularly, it relates to an automotive underwater system intended to circulate on a pipeline in open water, i.e. not laid on the seabed or buried into the seabed. It may be applied to any aquatic environment: ocean, sea, lake, river, etc., and the term "underwater" has to be taken in the general sense of a liquid/hydric environment.

In its preferential application, the system of the invention is mainly used to communicate in real time to the pipeline laying vessel information about in particular the position of the pipeline at different altitudes (from the bottom), its angulation, possibly images of the burial, and any other information useful for the laying.

TECHNOLOGICAL BACKGROUND

Systems intended to circulate on pipelines while being laid in marine environment are known from documents CN207298394U "Underwater pipeline inspection robot", EP3515807 "Underwater pipeline inspection crawler", CN106594455B "Double-claw type obstacle-crossing direction-adaptive pipeline external detection robot" and U.S. Pat. No. 9,863,891 "Vehicle for external inspection of pipes".

Documents WO2013/192536 A1, GB2 542 605 A, FR 2 847 987 A1, WO2018/057589 A1, WO2016/178045 A1, US2012/117959 A1 are also known.

The present invention proposes a solution that is simple while ensuring a good stability of the system and using widely-used rolling means such as wheels with rim-mounted tyres. Moreover, the proposed system enables the making of a train consisted of a chain of systems and also capable of circulating on the pipeline.

DISCLOSURE OF THE INVENTION

Generally, the invention relates to an automotive underwater system including:

mobility means enabling it to move along the outer surface of a pipeline, coaxially to said pipeline, the pipeline being longitudinally extended along a pipeline axis, a body elongated along a body axis, the body having a front end and a rear end, at least three bearing members mounted on the body in such a way as to each bear in a mobile, rolling or sliding, way on the pipeline, in order to create a mobile connection between said body and said pipeline, enabling the body to roll and/or slide in a stable way in at least one direction at least parallel to the pipeline axis, on the surface of said pipeline, at least one articulated side arm carrying one at least of the bearing members to enable this bearing member to move transversely to the body axis between, on the one hand, an open position for installing the system on the pipeline with the other bearing members bearing against the pipeline, and, conversely, uninstalling the system, and on the other hand, a service position in which said at least one bearing member carried by said at least one articulated side arm is folded back against the pipeline in order to form, with the other bearing members, said mobile connection of the body to the pipeline, said at least one articulated side arm being held in service position by at least one blocking member, at least three of said bearing members being applied, in the service position, on the pipeline surface in radial directions angularly offset about the body axis and distinct from each other.

In an advantageously mode of implementation, in which the bearing members are four in number and are wheels, it is therefore an automotive underwater system including rolling means enabling it to move in a stable way along the outer surface of a pipeline, coaxially to said pipeline, the pipeline being longitudinally extended along a pipeline axis, the system including a body elongated along a body axis, the body having a front end and a rear end, the body having, on the pipeline side and towards each of the two ends of said body, a front wheel and a rear wheel, respectively, for enabling the body to roll at least parallel to the pipeline on the surface of said pipeline, the front end and the rear end being arranged in a same plane containing the body axis, the body including, between its two ends, two articulated side arms ended by two side wheels, wherein the two side wheels can be moved against or away from the pipeline surface by moving the two articulated side arms, each wheel being of circular shape defining a circular plane and having a rotation axis perpendicular to said circular plane and passing by the centre of said circular plane, and wherein, when the two front and rear wheels and the two side wheels are applied against the pipeline, the two side wheels are applied on the pipeline surface in radial directions angularly offset about the pipeline axis and distinct from each other and with respect to the radial direction of application of the front and rear wheels, and the points of application of the two side wheels on the pipeline surface are contained in an intermediate pipeline section plane, the point of application of the front wheel on the pipeline surface is contained in a front pipeline section plane, the point of application of the rear wheel on the pipeline surface is contained in a rear pipeline section plane, and the intermediate pipeline section plane is, along the pipeline, in an intermediate position between the front pipeline section plane and the rear pipeline section plane.

It is to be understood that the term "point" of application of a wheel corresponds in practice to a portion of the wheel tread, i.e. an area of a certain extent, given that the wheel is not in practice an absolutely flat and non-deformable disc, but has a certain thickness and preferably a certain flexibility, so that the wheel is in practice applied to a certain surface of the pipeline. This tread is substantially cylindrical in shape and perpendicular to the circular plane of the wheel. It is also to be understood that the considered automotive underwater system has a body axis positioned parallel to the pipeline axis for a movement over the pipeline length while remaining essentially in such a configuration of parallel body and pipeline axes that the system, during its movement, remains in a constant radial direction with respect to the pipeline axis. In these conditions, a pipeline section plane is a plane transverse to the pipeline and hence perpendicular to the pipeline axis and, also, the front and rear wheels are applied along a same generatrix line of the pipeline surface and the two side wheels are applied along two other generatrix lines of the pipeline surface. However, it is to be understood that the body axis may be inclined with respect to the pipeline axis, in particular if the body is desired to move helically along and around the pipeline or to change its angular position about the pipeline, wherein at least one of the wheels can be directional to enable the mobility direction of the body on the pipeline to be controlled.

Other non-limiting and advantageous features of the system according to the invention, both generally and according to its advantageous mode of implementation, taken individually or according to all the technically possible combinations, are the following:

- the bearing member or at least one of the bearing members mounted/arranged on the body for a rolling mobile bearing is a wheel,
- the bearing member or at least one of the bearing members mounted on the body for a rolling mobile bearing is a endless belt track,
- the endless belt track includes at least two wheels,
- the bearing member or at least one of the bearing members mounted on the body for a sliding mobile bearing is a skid,
- the bearing members are four in number and are four skids, the system including a front skid and a rear skid arranged in a same plane containing the body axis, the system including two articulated side arms ended by two side skids,
- the bearing members are four in number and are one wheel and three skids, the system including a front wheel and a rear skid arranged in a same plane containing the body axis, the system including two articulated side arms ended by two side skids,
- the bearing members are four in number and are one wheel and three skids, the system including a front skid and a rear wheel arranged in a same plane containing the body axis, the system including two articulated side arms ended by two side skids,
- the bearing members are four in number and are two wheels and two skids, the system including a front wheel and a rear wheel arranged in a same plane containing the body axis, the system including two articulated side arms ended by two side skids,
- the bearing members mounted on the body for a mobile bearing are all of the rolling type,
- in the system with a front wheel and a rear wheel arranged in same plane containing the body axis, the front wheel and the rear wheel are surrounded by a common endless belt in order to form a track,
- at least two of the bearing members are wheels,
- at least three of the bearing members are wheels,
- the bearing members are four in number, the system including a front bearing member and a rear bearing member arranged in a same plane containing the body axis, the system including two articulated side arms ended by two side bearing members, wherein the two side bearing members can be moved against or away from the pipeline surface by movements of the two articulated side arms, each side bearing member and the unit consisted by the two aligned front and rear bearing members being applied on the pipeline surface in radial directions angularly offset about the pipeline axis, and the points of application of the two side bearing members on the pipeline surface being contained in an intermediate pipeline section plane, the point of application of the front bearing member on the pipeline surface being contained in a front pipeline section plane, the point of application of the rear bearing member on the pipeline surface being contained in a rear pipeline section plane, the intermediate pipeline section plane being, along the pipeline, in an intermediate position between the front pipeline section plane and the rear pipeline section plane,
- the bearing members are four in number and are wheels, the system including a front wheel and a rear wheel arranged in a same plane containing the body axis, the system including two articulated side arms ended by two side wheels, wherein the two side wheels can be moved against or away from the pipeline surface by movements of the two articulated side arms, each wheel being of circular shape defining a circular plane and having a rotation axis perpendicular to said circular plane and passing by the centre of said circular plane, and wherein, when the two front and rear wheels and the two side wheels are applied against the pipeline, the two side wheels are applied on the pipeline surface in radial directions angularly offset about the pipeline axis and distinct from each other and with respect to the radial direction of application of the front and rear wheels, and the points of application of the two side wheels on the pipeline surface are contained in an intermediate pipeline section plane, the point of application of the front wheel on the pipeline surface is contained in a front pipeline section plane, the point of application of the rear wheel on the pipeline surface is contained in a rear pipeline section plane, and the intermediate pipeline section plane is, along the pipeline, in an intermediate position between the front pipeline section plane and the rear pipeline section plane,
- the intermediate pipeline section plane is, along the pipeline, in an intermediate position located at equal distance between the front pipeline section plane and the rear pipeline section plane,
- the articulated side arms include means ensuring at least one of the following capabilities: retractable, telescopic, swivelling,
- each wheel includes a rim-mounted tyre, the tyre having a tread substantially perpendicular to the circular plane of the wheel,
- the tyres are filled with liquid,
- the tyres are solid tyres,
- the solid tyres are filled with a synthetic foam,
- the system is configured in such a way that the circular planes of the wheels are in radial planes of the pipeline axis when the two front and rear wheels and the two side wheels are applied against the pipeline,
- at least the articulated side arms and the side bearing members include a tilt adjustment device intended to place the bearing plane of each side bearing member substantially tangent to the pipeline surface when the two front and rear bearing members and the two side bearing members are applied against the pipeline,
- at least the articulated side arms and their side wheels include a wheel tilt adjustment device intended to place each wheel circular plane in a plane radial to the pipeline axis in such a way that the tread is substantially tangent to the pipeline surface when the two front and rear wheels and the two side wheels are applied against the pipeline, at least one of the two articulated side arms includes, beyond its side bearing member, a retractable connecting profile intended to form, when the two front and rear bearing members and the two side bearing members are applied against the pipeline, a direct detachable connection between the two side bearing members in order to surround the pipeline, each of the two articulated side arms includes, beyond its respective side bearing member, a retractable connecting profile intended to form, when the two front and rear bearing members and the two side bearing members are applied against the pipeline and when the two profiles are joined together, a direct detachable connection between the two side bearing members in order to surround the pipeline, a single one of the two articulated side arms includes, beyond its side bearing member, a retractable connecting profile designed to form, when the two front and rear bearing members and the two side bearing members are applied against the pipeline and when the profile is joined to the other side bearing member, a direct detachable connection between the two side bearing members in order to surround the pipeline, at least one of the two articulated side arms includes, beyond its side wheel, a retractable connecting profile intended to form, when the two front and rear wheels and the two side wheels are applied against the pipeline, a direct detachable connection between the two side wheels in order to surround the pipeline, each of the two articulated side arms includes, beyond its respective side wheel, a retractable connecting profile intended to form, when the two front and rear wheels and the two side wheels are applied against the pipeline and when the two profiles are joined together, a direct detachable connection between the two side wheels in order to surround the pipeline, a single one of the two articulated side arms includes, beyond its side wheel, a retractable connecting profile intended to form, when the two front and rear wheels and the two side wheels are applied against the pipeline and when the profile is joined to the other side wheel, a direct detachable connection between the two side wheels in order to surround the pipeline, the connecting profile(s) are adjustable in length, in order to enable an adjustment of the system according to the pipeline diameter, the articulated side arm(s) are adjustable in length, in order to enable an adjustment of the system according to the pipeline diameter, the retractable connecting profile or at least one of the two retractable connecting profiles include means ensuring at least one of the following capabilities: retractable, telescopic, swivelling, the bearing members have a fixed orientation once the two front and rear bearing members and the two side bearing members are applied against the pipeline, i.e. they are not directional, the wheels have a fixed orientation once the two front and rear wheels and the two side wheels are applied against the pipeline, i.e. they are not directional, and the circular planes of the wheels cannot swivel, at least one of the bearing members is directional to enable the mobility direction of the body on the pipeline to be controlled, at least one of the wheels is directional, and the circular plane of the wheel can swivel, the front wheel is directional, the rear wheel is directional, the two side wheels are directional, the mobility means include a motorization, the motorization drives at least one of the bearing members, the motorization drives at least one of the wheels, the motorization is ensured by a propeller thruster or a turbine arranged on the system body, at least one of the bearing members is motorized to enable a controlled movement of the body on the pipeline, the system is configured in such a way that the body moves with at least one mobility in the direction of the body axis, the system is further configured in such a way that the body moves with a mobility in a direction orthoradial to the body axis, at least two of the bearing members are wheels and the system includes a front wheel and a rear wheel arranged in a same plane containing the body axis, at least one of the front wheel and the rear wheel being motorized, at least one of the wheels is motorized to enable a movement of the body along the pipeline when the two front and rear wheels and the two side wheels are applied against the pipeline, the motorized wheel is driven by an electric motor, the driven motorized wheel includes an electric motor, the driven motorized wheel has no electric motor, a transmission being arranged between the wheel and the electric motor, the transmission is ensured by one or several elements among a rigid or flexible or articulated transmission shaft, gears, a pressure roller applied on the wheel, at least one of the front wheel and the rear wheel is motorized, the system can move forward, the system can move rearward, the system includes a motorized wheel slip detector, the system includes rechargeable electric batteries, at least one of the front and rear wheels includes a braking member, the two side wheels include braking members, the braking members have “ABS” systems, the braking members use the electric motorization in electric generator mode, the electric motorization in electric generator mode is further used to recharge rechargeable electric batteries of the system, the wheels have no shock absorbers, at least the front and rear wheels are mounted on shock absorbers, the side wheels are mounted on their respective articulated side arms through shock absorbers, the articulated side arms are mounted on the body through shock absorbers, the articulation of the articulated side arm is ensured by at least one cylinder, the cylinder is electric, the cylinder is hydraulic, each articulated side arm is held in service position by at least one blocking member, said at least one blocking member being a cylinder also used to articulate the articulated arm, each articulated side arm includes an emergency release device intended to stop the service position by releasing the pipeline surrounding and to enable the system to be released from the pipeline, the blocking member of the articulated side arm includes an emergency release device intended to stop the service position by releasing the pipeline surrounding and to enable the system to be released from the pipeline, the emergency release device is directly remote-controlled, that is to say without using any system equipment, the remote-control being made in particular by acoustic waves, the system release from the pipeline causes the system to go back to the surface, said system having a positive buoyancy, in the case where the system also includes one or several connecting profiles, at least one of them also includes an emergency release device, the front end and the rear end of the body include complementary coupling devices in such a way that the adjoining ends of two bodies of two systems can be coupled together and that a train consisted of a chain of systems can be formed, in which the systems are coupled together by pairs, the complementary coupling devices include removable locking means, the system is a prime mover essentially comprising drive units with at least one motorized wheel, the system is an actuator intended to perform at least one action other than motricity, at least one of the actuators is a thruster positioner in water including a propeller or a turbine, said thruster positioner being intended to exert a force substantially transverse to the pipeline axis to move the pipeline in a plane substantially perpendicular to the pipeline axis, the system is an explorer intended to execute measurements, the system includes acoustic transmission means, the system is equipped with an acoustic beacon for positioning the system using positioning means, especially located on the surface, the system includes sensors, the system includes an acoustic positioning beacon, the system includes acoustic communication modem, the system includes an attitude central unit, the attitude central unit enables the angular position of the system and of the pipeline to be measured, the system includes feedback-control means receiving the angular position of the system in order to orient the acoustic transmission means in a determined direction, in particular towards the surface or towards the laying vessel, the acoustic transmission means are placed in an enclosure connected by a flexible cable to the system and the enclosure has a positive buoyancy causing it to orient upward in water in a substantially predictive manner once the system submerged and in order to orient the acoustic transmission means in a determined direction, the flexible cable is on a reel for releasing or recovering lengths of flexible cable, the system includes an attitude central unit and acoustic transmission means comprising an acoustic positioning beacon and/or an acoustic communication modem, the attitude central unit enabling in particular the angular position of the system to be measured, the system further including feedback-control means receiving the angular position of the system in order to orient the acoustic transmission means in a determined direction, in particular towards the surface or towards the laying vessel, the system includes oceanographic sensors, the system includes video means, the system is both an actuator and an explorer, the actuator and/or explorer means are carried by the system body, the actuator and/or explorer system includes at least one motorized wheel, the actuator and/or explorer system has no motorized wheel, the train is consisted of a system that is a primer mover and at least one actuator and/or explorer system, the system is both a prime mover and an actuator intended to perform at least one action other than motricity and/or an explorer, the front end and the rear end of the body further include complementary guiding shapes intended to ensure centring and alignment of the two bodies when the respective ends of these latter are moved closer together, the two complementary guiding shapes are male and female cones, the coupling is rigid, the coupling is flexible, the coupling is articulated, the coupling further includes means for electric connection between systems, in particular for power and/or data, the coupling further includes means for optical connection between systems, in particular for data, the coupling further includes means for pneumatic connection between systems, the coupling further includes means for hydraulic connection between systems, the front end and the rear end of the body include complementary electric connectors, said electric connectors being intended for data and/or for power supply, the connectors belong to connection means of the couplings, the systems include means for wireless data link between each other, in particular optical and/or radio and/or audio, the systems include means for wireless data link, in particular optical and/or radio and/or audio, with third-party equipment, in particular a surface vessel emitter-receiver or an emitter-receiver head of a cable introduced into the pipeline or installed on or in the pipeline, the systems are remote controlled, the systems are controlled by pre-programmed commands stored inside them, the body includes a frame and at least one payload, the system is arranged in such a way as to be substantially symmetrical in shape with respect to a sagittal plane carried by the body axis and passing through the circular planes of the front and rear wheels, the system is arranged in such a way as to be substantially symmetrical for the weight distribution with respect to a sagittal plane carried by the body axis and passing through the circular planes of the front and rear wheels, preferably, the system has a proper positive buoyancy, the proper buoyancy of the system is very slightly positive, the system has a whole length of 1230 mm, the system body has a width of about 560 mm.

The invention also relates to a train consisted of a set of systems according to the invention that are coupled together by pairs.

DETAILED DESCRIPTION OF AN EXEMPLARY EMBODIMENT

The following description in relation with the appended drawings, given by way of non-limiting examples, will allow a good understanding of what the invention consists of and of how it can be implemented.

Generally, the system of the present invention is similar to a device that is at least tripod, and preferably quadruped, whose feet are bearing members each able to bear in a mobile, rolling or sliding, way on the pipeline, in order to create a mobile connection between the feet and said pipeline, and enabling the device to roll and/or slide in a stable way in at least one direction parallel to the pipeline axis.

In its advantageous mode of implementation, the system of the present invention is similar to a bicycle with two wheels, a front one and a rear one, with in addition two stabilizing side wheels at the end of two articulated side arms, these stabilizing side wheels being however arranged in an intermediate transverse plane between the front wheel and the rear wheel of the bicycle. Moreover, in the present application on an outer surface of a pipeline, the four contact points of the wheels are distributed in space because on the pipeline perimeter when the system is installed on said pipeline.

The system of the invention can move underwater along the pipeline, in a stable way, but due to the fact that is encircles/surrounds the pipeline, this is possible only in the areas of the pipeline in which the latter is in open water, free on all its faces, i.e. not yet laid on the bottom or even buried in the case of pipeline laying.

The system includes a means for docking or position locking, to ensure fixed parking of the system on the pipeline reel that is on the pipeline laying vessel. In the parked position, the system wheels are free to rotate in order to allow the pipeline to circulate freely. This docking or position locking means is removable so that the system can be released and can follow the unwound pipeline and circulate on this pipeline.

The system is motorized and is preferably energy autonomous with typically an electric motorization and rechargeable electric batteries. A wire link with a surface vessel is also contemplated for data transmission, including commands, and/or energy, in particular electric. It will be seen that it is possible to form a train of systems and, in this case, one of the systems of the train can be linked by wire/cable to the surface vessel, the other systems of the train sharing the data and/or the energy provided by the wire link thanks to a data and/or energy bus running the length of the train and resulting from the coupling of the different systems of the train.

An exemplary embodiment of a system will now be described.

Figure 1:
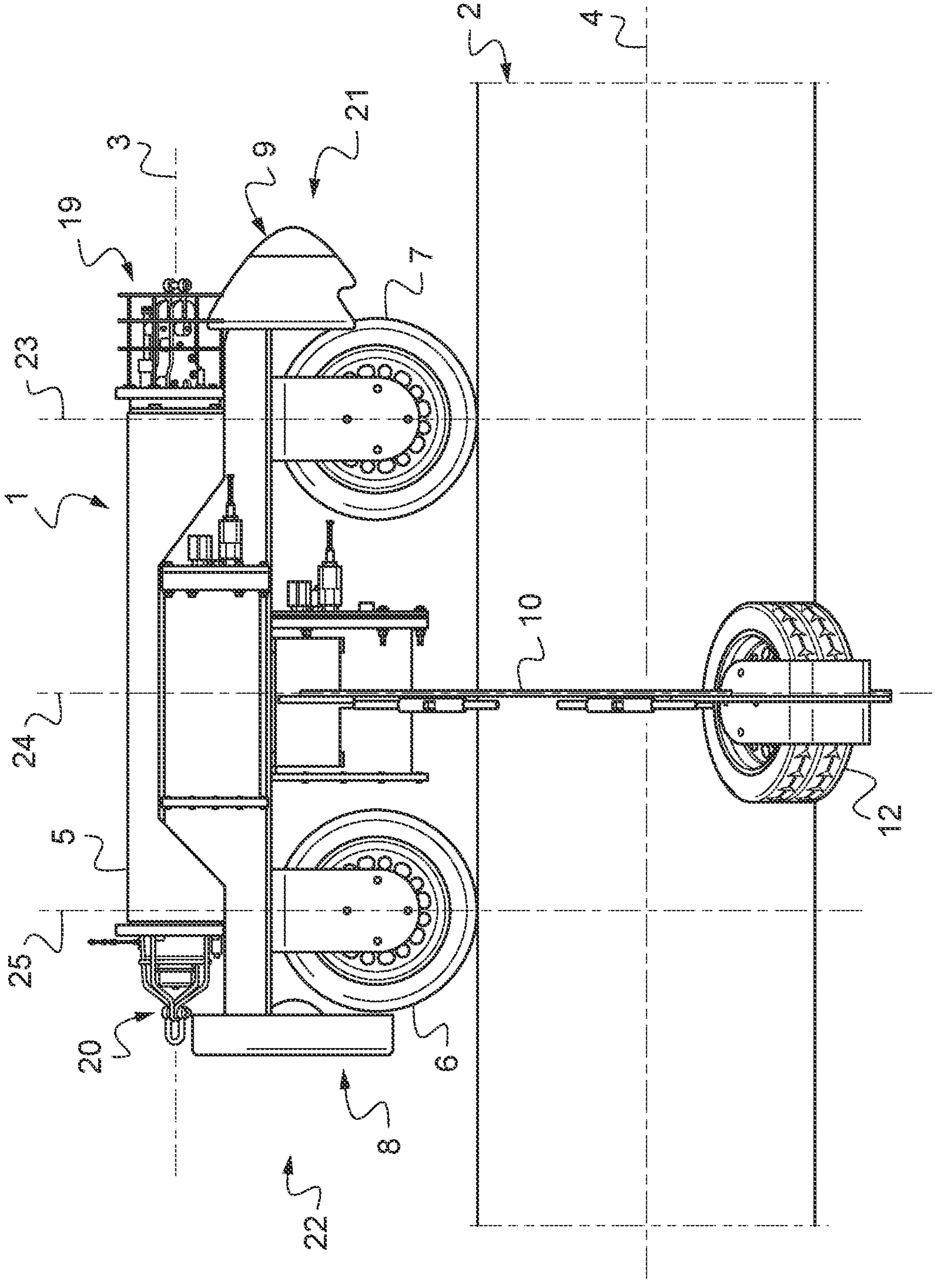
FIG. 1 is a side view of a system installed, in service position, on a pipeline.
Figure 2:
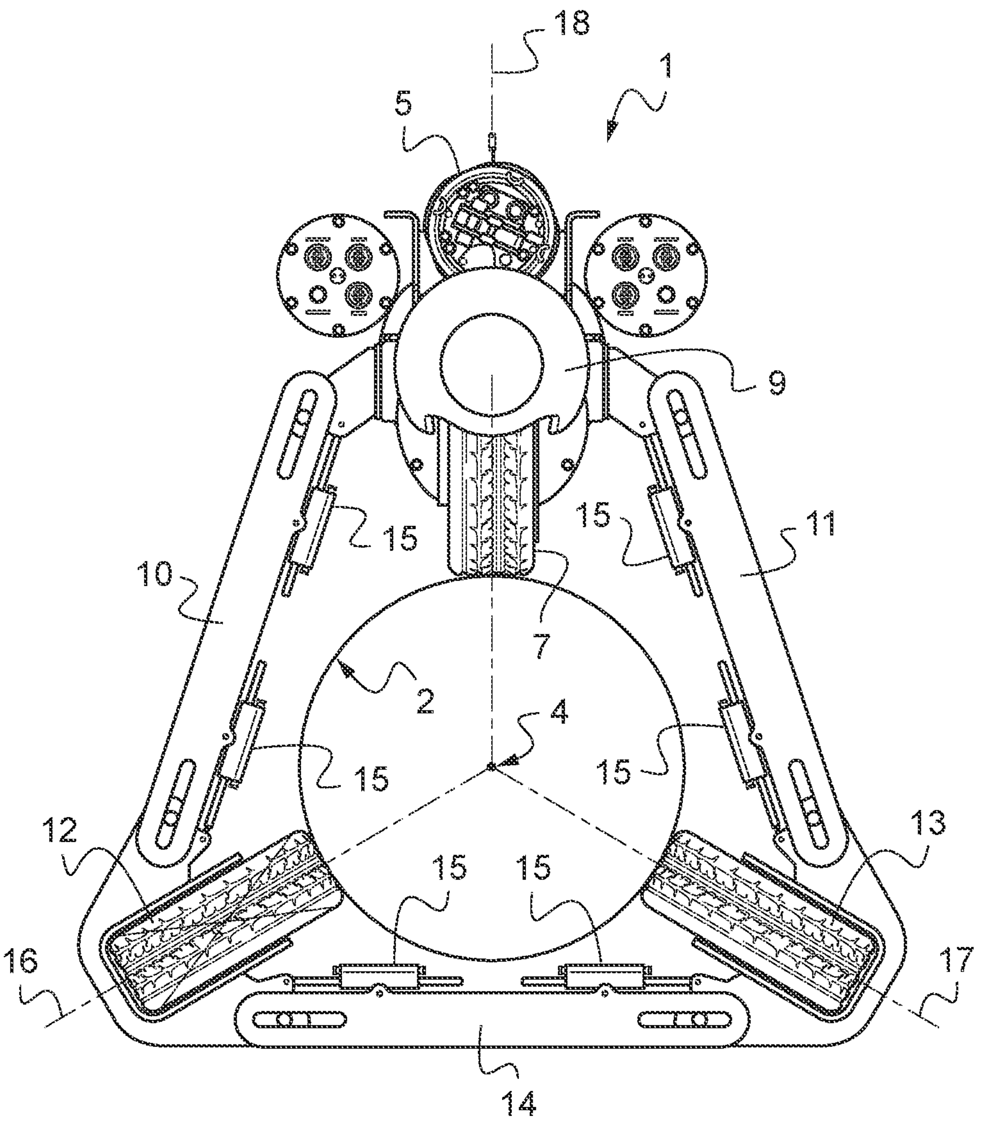
FIG. 2 is a front view of the system installed, in service position, on the pipeline.

In FIGS. 1 and 2, the system 1 is installed on the pipeline 2 and essentially encircles/surrounds the latter at a distance, only the wheels 6, 7, 12, 13 coming in contact with the pipeline surface. The wheels are of the rim-mounted tyre type. The pipeline 2 is here cylindrical and elongated about a pipeline axis 4.

The system has a body 5 including any useful piece of equipment for actuator and/or explorer means in addition to useful devices for motorization and for control and command of the system. The body 5 is here consisted of individual blocks of equipment. In other embodiments, other forms of blocks are possible and a fairing can even be provided.

As can be better seen in FIG. 2, the system 1 and in particular its body 5 are symmetrical with respect to a sagittal plane in order to balance the system and to prevent it from tilting to one side when the body is above the pipeline, vertically to the pipeline axis 4. In this configuration, the centre of gravity of the system can be relatively high with respect to the pipeline axis 4 as a function of the weight of the body 5 with respect to the articulated side arms 10, 11, the side wheels 12, 13 and the connecting profile(s) 14. Therefore, in other embodiments, additional weights are provided, towards the side wheels and/or the connecting profile(s) 14 and/or it is provided to lower some of the body equipment or even to install them on the articulated side arms.

The body is elongated along a body axis 3, between a front end 21 and a rear end 22. The front end and the rear end include complementary coupling devices 19, respectively 20, and complementary guiding shapes 9, 8. On the pipeline 2 side of the body 5, a front wheel 7 is installed towards the front end 21 and a rear end 6 is installed towards the rear end 22.

The articulated side arms 10, 11 are arranged on both sides of the body 5 and the two side wheels 12, 13 are arranged at their side ends. Preferably, positioning means enable that the treads of the wheels 6, 7, 12, 13 are applied tangentially to the pipeline surface and hence that the circular planes of the wheels are carried by radial axes 16, 17, 18, about the pipeline axis 4, as can be seen in FIG. 2. The arrangement of the wheels about the pipeline, in cross view (FIG. 2), is preferably equiangular with an angle of 360/3=120° between two adjacent wheels. The arrangement of the wheels along the pipeline, in side view (FIG. 1), is preferably such that the intermediate pipeline section plane 24 of application of the side wheels 12, 13 on the pipeline is at equal distance from the front pipeline section plane 23 of application of the front wheel 7 and from the rear pipeline section plane 25 of application of the rear wheel 6.

Adjustment devices 15, preferably provided with damping, enable adjustment of the positions and lengths of the articulated side arms 10, 11 and the connecting profile(s) 14, in particular to bring them to the service position. The adjustment devices 15, which are here cylinders, further enable the articulated side arms 10, 11 and the connecting profile(s) 14 to be blocked in position and length, so that they also constitute blocking members.

It is understood that the system is configured to be open and removed from the pipeline, typically by opening the connecting profile 14 and by moving the side wheels 12, 13 apart by action on the articulated side arms 10, 11. The system closing and opening may be manual but controllable actuation members, in particular cylinders, may be used to control the articulated side arms 10, 11 and/or the connecting profiles 14, in order to open and close the system.

Advantageously, each articulated side arms includes an emergency release device for leaving the service position and opening the arms, when activated, in particular from the surface, thanks to an acoustic signal in order to release the pipeline and to enable the system to go back to the surface and to float thereon, the system having a positive buoyancy. In an alternative, each emergency release device, when activated, thus releasing the arms, causes a balloon to be inflated by a gas, the balloon being connected to the system, the balloon being for example of the "air-bag" type. It is to be understood that, in the case where the system also includes one or several connecting profiles, at least one of them also includes an emergency release device for its opening thanks to an acoustic signal.

Figure 3:
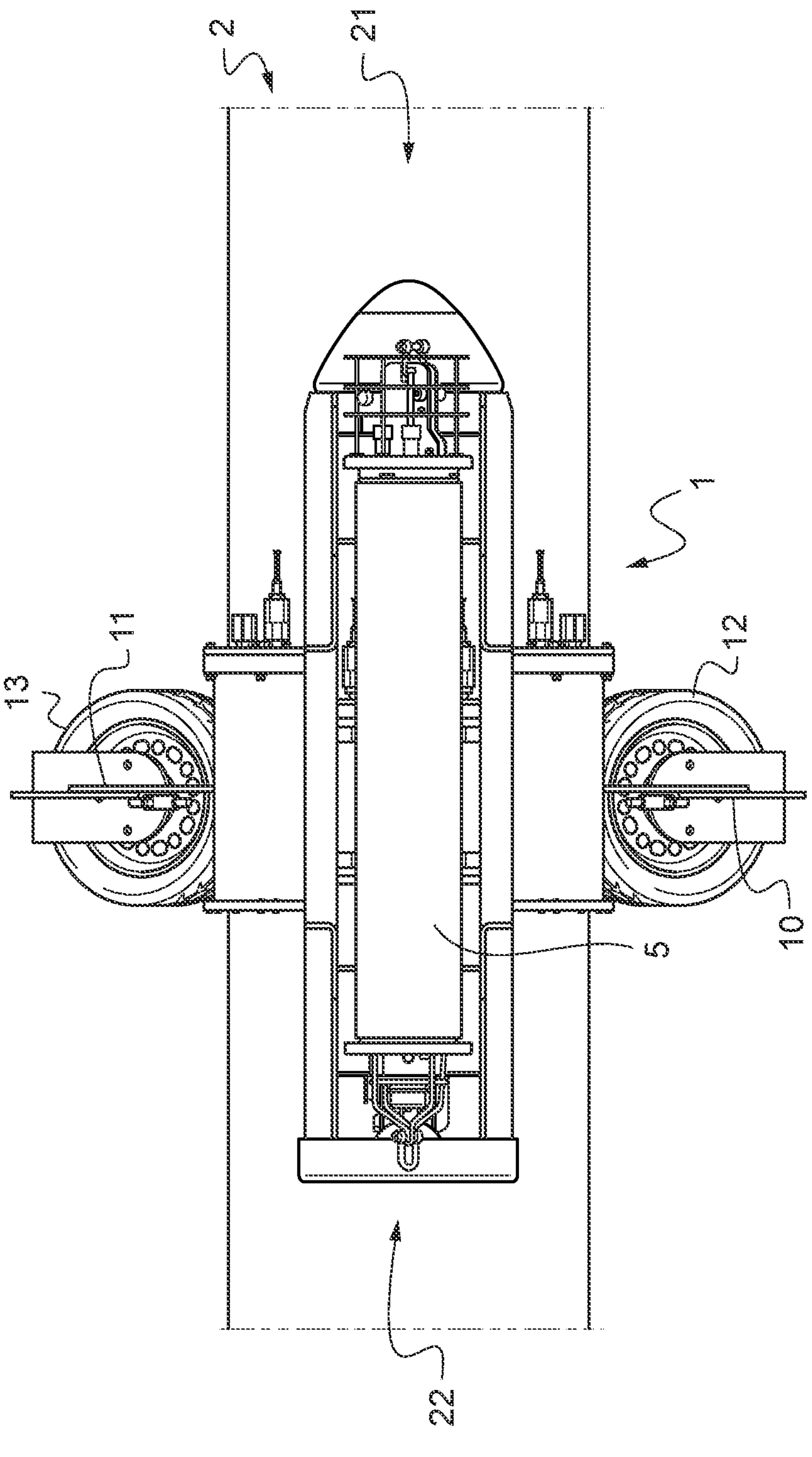
FIG. 3 is a top view of the system installed, in service position, on the pipeline.

FIG. 3, which is a bird's-eye view from above, makes it possible to visualize, in addition to the body 5, the two side wheels 12, 13 at the end of their respective articulated side arms 10, 11.

Figure 4:
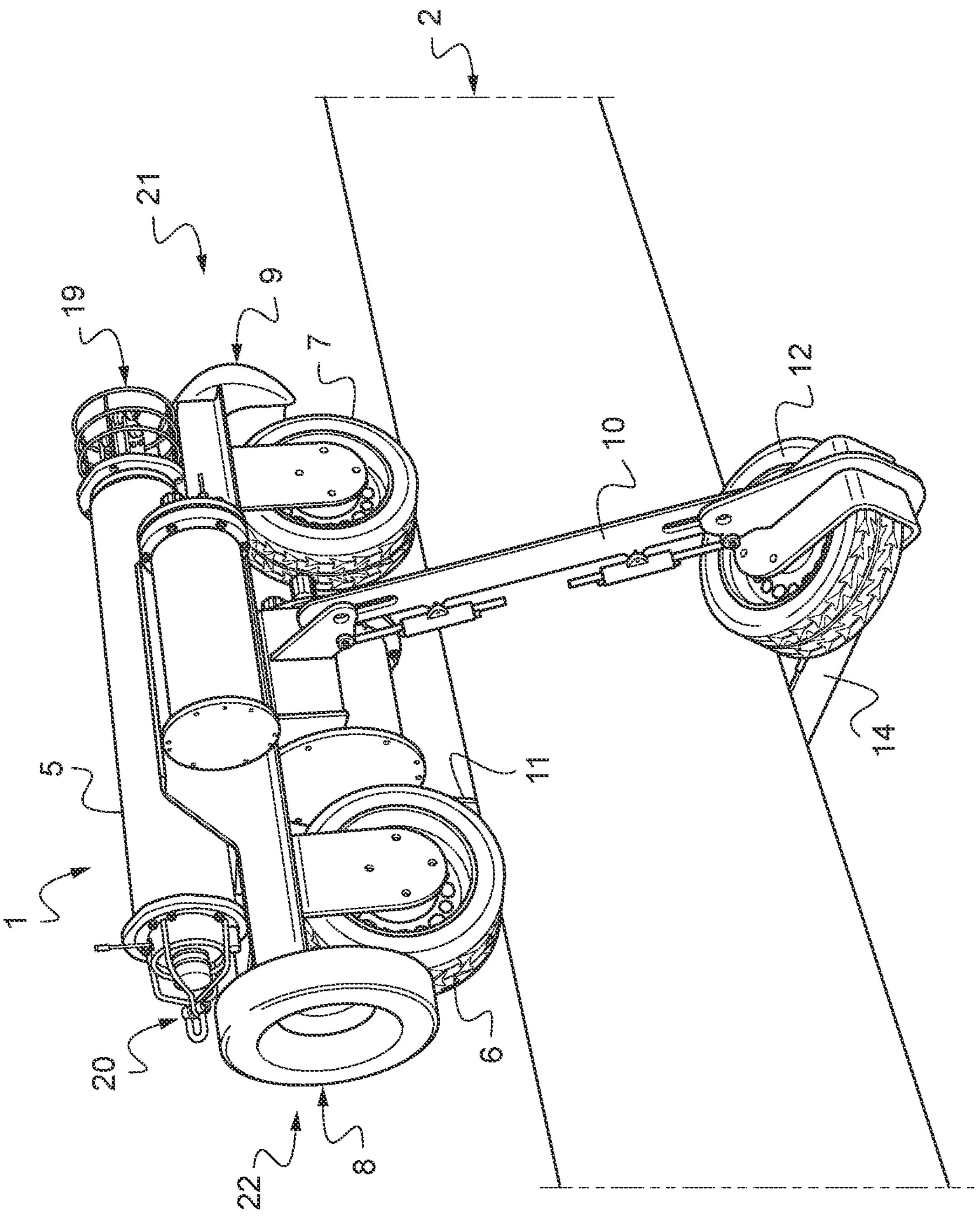
FIG. 4 is a perspective view of the system installed, in service position, on the pipeline.

In FIG. 4, in rear perspective view, the rear end 22 of the body 5 is better seen, in particular the cone-shaped female guiding shape 8 that is complementary of the male guiding shape 9 that is located on the front 21 of the body 5.

The systems 1 can be attached and coupled by pair thanks to the complementary coupling devices 19, 20, in order to form a train of systems 1. During this coupling, automatic electrical connections can be provided, in particular for power and/or data, or even for fluids including gas and/or hydraulic in order to form corresponding bus along the train.

It is also provided that the systems, which each have at least one rechargeable electrical battery and which are coupled/attached together, can exchange electrical energy or transmit electrical energy on a bus, possibly coming by cable from a surface vessel, in particular to recharge the electrical batteries.

Figure 5:
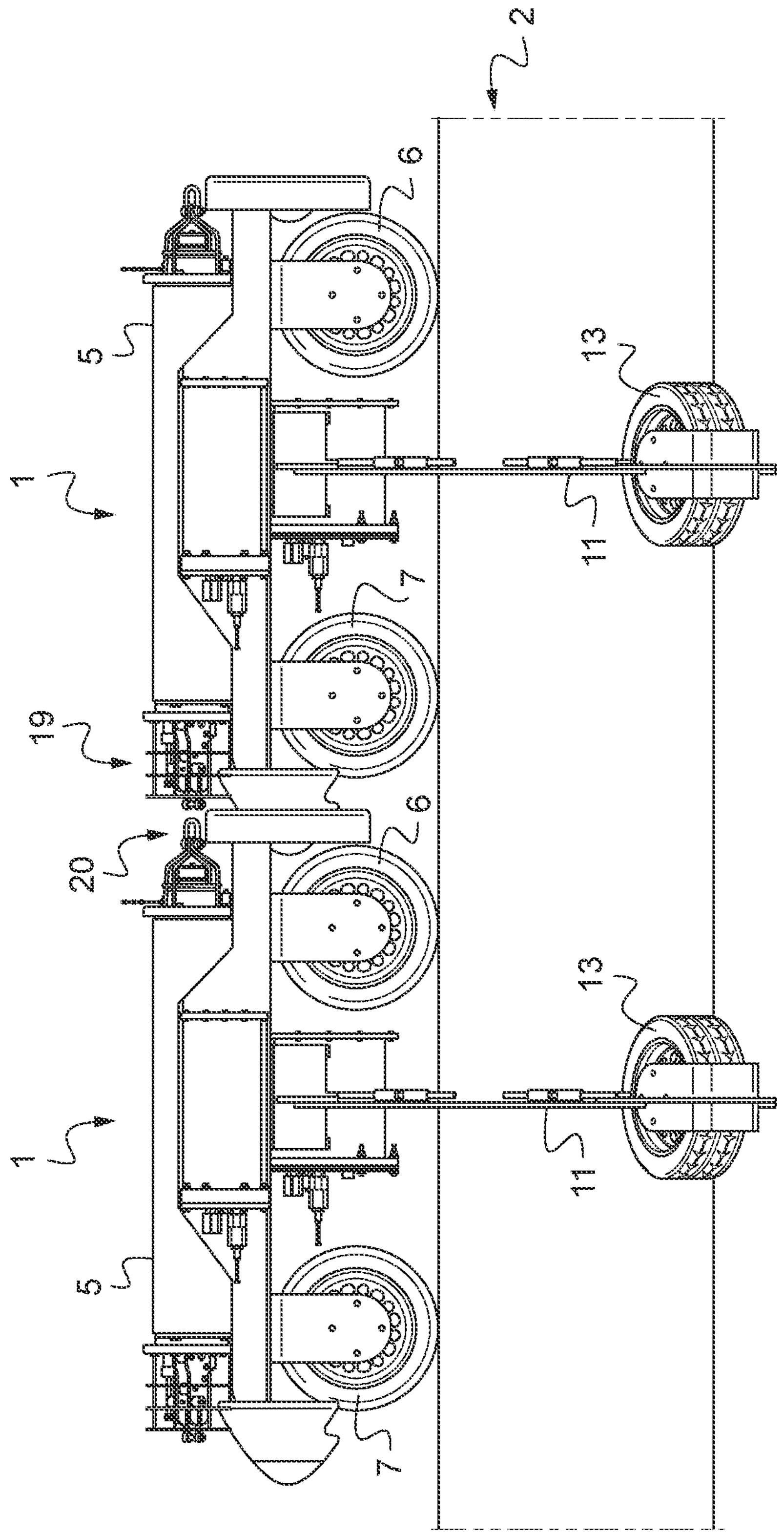
FIG. 5 is a side view of part of a train in service position on the pipeline, the train being consisted of a set of systems according to the invention that are coupled together by pairs.

In FIG. 5, the two systems 1 shown are being attached because the two guiding shapes 8, 9 are not fully coupled together and the complementary coupling device 19, 20 are not yet entered in contact, the contact ensuring the locking between the two systems 1.

Each of the modules can be remote-controlled in the case where a wire link would not be provided with a surface vessel.

The description and claims mention an application to an underwater pipeline, but it is to be understood that the system is also adapted to underwater cables, which are known to have a relatively large diameter due to the necessary isolation and protections.

Although the system can serve for the inspection of underwater pipelines or cables in areas in which they are free, it is essentially useful in the field of underwater pipeline or cable laying because, at this time, a great part of the pipeline has not yet been laid on or buried in the bottom, this part extending from the surface vessel performing the laying. Indeed, the system is configured to surround the cable or the pipeline.

The main application of the system is the accurate positioning of the point of contact of the pipeline with the bottom. For that purpose, one or several steerable wheels are advantageously implemented, preferably the front wheel and/or and the rear wheel, in order to control the rotation positioning of the system about the pipeline axis. For positioning the pipeline, it is also advantageous that one or several actuators of the system are thruster positioners in water, so that the pipeline can be moved in a plane substantially perpendicular to the pipeline axis.

Likewise, it is advantageous that the system includes sensors, and in particular an attitude central unit, as well as acoustic transmission means, in particular acoustic positioning beacon and/or acoustic communication modem. The attitude central unit makes it possible in particular to measure the angular position of the system and thus of the pipeline, and this angular position is a valuable piece of information to be communicated to the surface and the laying vessel because it helps to know the behaviour of the pipeline that is being laid.

The invention claimed is:

1. An automotive underwater system comprising:

mobility devices enabling the automotive underwater system to move along an outer surface of a pipeline, coaxially to said pipeline, the pipeline being longitudinally extended along a pipeline axis;

a body elongated along a body axis, the body having a front end and a rear end;

at least four bearing members mounted on the body to each bear in a mobile, rolling or sliding, way on the pipeline, in order to create a mobile connection between said body and said pipeline, enabling the body to roll and/or slide in a stable way in at least one direction at least parallel to the pipeline axis, on the surface of said pipeline, the bearing members being wheels including a front wheel and a rear wheel disposed in a same plane containing the body axis;

at least two articulated side arms each carrying at least one of the bearing members to enable the at least one bearing member to move transversely to the body axis between an open position to install the automotive underwater system on the pipeline with the other bearing members bearing against the pipeline, and uninstalling the automotive underwater system, and a service position in which said bearing members carried by said at least two articulated side arms are folded back against the pipeline in order to form, with the other bearing members, said mobile connection of the body to the pipeline, said at least two articulated side arms being held in service position by at least one blocking member;

at least three of said bearing members being applied, in the service position, on the pipeline surface in radial directions angularly offset about the body axis and distinct from each other; and two articulated side arms ended by two side wheels, configured to be moved against or away from the pipeline surface by moving the two articulated side arms, each of the wheels being of circular shape defining a circular plane and having a rotation axis perpendicular to said circular plane and passing by the center of said circular plane, wherein, when the front wheel and rear wheel and the two side wheels are applied against the pipeline, the two side wheels are applied on the pipeline surface in radial directions angularly offset about the pipeline axis and distinct from each other and with respect to the radial direction of application of the front and rear wheels, and the points of application of the two side wheels on the pipeline surface are contained in an intermediate pipeline cross-sectional plane, the point of application of the front wheel on the pipeline surface is contained in a front pipeline cross-sectional plane, the point of application of the rear wheel on the pipeline surface is contained in a rear pipeline cross-sectional plane, and the intermediate pipeline cross-sectional plane is, along the pipeline, in an intermediate position between the front pipeline cross-sectional plane and the rear pipeline cross-sectional plane; and wherein at least one of the two articulated side arms includes, beyond the respective side wheel, a retractable connecting profile configured to form, when the two front and rear wheels and the two side wheels are applied against the pipeline, a direct detachable connection between the two side wheels in order to surround the pipeline.

2. The system according to claim 1, wherein the intermediate pipeline section plane is, along the pipeline, in an intermediate position located at equal distance between the front pipeline section plane and the rear pipeline section plane.

3. The system according to claim 2, wherein each wheel includes a rim-mounted tire, the tire having a tread substantially perpendicular to the circular plane of the wheel.

4. The system according to claim 3, wherein at least the articulated side arms and the side wheels include a wheel tilt adjustment device intended to place each wheel circular plane in a plane radial to the pipeline axis such that the tread is substantially tangent to the pipeline surface when the two front and rear wheels and the two side wheels are applied against the pipeline.

5. The system according to claim 1, wherein the retractable connecting profile or at least one of the two retractable connecting profiles include means ensuring at least one of the following capabilities: retractable, telescopic, and swiveling.

6. The system according to claim 1, wherein each of the articulated side arms includes an emergency release device configured to stop the service position by releasing the pipeline surrounding and to enable the system to be released from the pipeline, and in the case where the system also includes one or several connecting profiles, at least one of the one or several connection profiles also includes an emergency release device.

7. The system according to claim 1, wherein at least one of the bearing members is directional to enable the mobility direction of the body on the pipeline to be controlled.

8. The system according to claim 1, wherein at least one of the bearing members is motorized to enable a controlled movement of the body on the pipeline.

9. The system according to claim 8, wherein at least one of the front wheel and the rear wheel are motorized.

10. The system according to claim 1, wherein the front end and the rear end of the body include complementary coupling devices such that the adjoining ends of two bodies of two systems are configured to be coupled together and that a train consisting of a chain of systems is able to be formed, in which the systems are coupled together by pairs.

11. The system according to claim 10, wherein the front end and the rear end of the body further include complementary guiding shapes intended configured to ensure centering and alignment of the two bodies when the respective ends of the two bodies are moved closer together.

12. The system according to claim 1, wherein the front end and the rear end of the body include complementary electric connectors, said electric connectors being configured for data and/or for power supply.

13. The system according to claim 1, further comprising:

an attitude central system and acoustic transmission devices comprising one or more of an acoustic positioning beacon and an acoustic communication modem, the attitude central system enabling the angular position of the system to be measured; and feedback-control devices receiving the angular position of the system in order to orient the acoustic transmission devices in a determined direction towards the surface or towards the laying vessel.

14. The system according to claim 1, wherein each wheel includes a rim-mounted tire, the tire having a tread substantially perpendicular to the circular plane of the wheel.

15. The system according to claim 4, wherein at least the articulated side arms and the side wheels include a wheel tilt adjustment device configured to place each wheel circular plane in a plane radial to the pipeline axis such that the tread is substantially tangent to the pipeline surface when the two front and rear wheels and the two side wheels are applied against the pipeline.

16. The system according to claim 1, wherein each articulated side arm includes an emergency release device configured to stop the service position by releasing the pipeline surrounding and to enable the system to be released from the pipeline, and in the case where the system also includes one or several connecting profiles, at least one of the one or several connecting profiles includes an emergency release device.

17. The system according to claim 4, wherein at least one of the bearing members is directional to enable the mobility direction of the body on the pipeline to be controlled.

18. The system according to claim 1, wherein at least one of the bearing members is motorized to enable a controlled movement of the body on the pipeline, and at least one of the front wheel and the rear wheel are motorized.

19. The system according to claim 18, wherein each articulated side arm includes an emergency release device configured to stop the service position by releasing the pipeline surrounding and to enable the system to be released from the pipeline, and in the case where the system also includes one or several connecting profiles, at least one of the one or several connecting profiles also includes an emergency release device.

* * * * *